United States Patent [19]

Thoma et al.

[11] Patent Number: 4,507,413

[45] Date of Patent: Mar. 26, 1985

[54] PROCESS FOR THE PREPARATION OF COATING COMPOSITIONS, AQUEOUS DISPERSIONS OF PU REACTIVE SYSTEMS AND THEIR USE FOR COATING

[75] Inventors: Wilhelm Thoma; Rolf Langel; Anton Schmitz; Walter Schröer, all of Leverkusen, Fed. Rep. of Germany

[73] Assignee: Bayer Aktiengesellschaft, Leverkusen, Fed. Rep. of Germany

[21] Appl. No.: 520,966

[22] Filed: Aug. 8, 1983

[30] Foreign Application Priority Data

Aug. 20, 1982 [DE] Fed. Rep. of Germany ....... 3231062

[51] Int. Cl.$^3$ .................. C09D 3/72; C08L 75/08; D06N 3/14; C14C 11/00
[52] U.S. Cl. ......................... 524/42; 524/45; 528/45; 525/125; 525/131; 427/393.5; 428/423.4; 428/423.5; 428/423.7; 428/425.1; 428/904
[58] Field of Search ............ 524/42, 45; 528/45; 428/423.4, 423.5, 423.7, 425.1, 904; 427/393.5; 525/125, 131

[56] References Cited

U.S. PATENT DOCUMENTS

| | | | |
|---|---|---|---|
| 3,384,506 | 5/1968 | Elkin | 117/62 |
| 4,242,410 | 12/1980 | König et al. | 528/64 |
| 4,248,756 | 2/1981 | Konig et al. | 528/45 |
| 4,299,868 | 11/1981 | Berndt et al. | 427/389.9 |
| 4,308,184 | 12/1981 | Thoma et al. | 524/233 |
| 4,446,293 | 5/1984 | König et al. | 528/45 |

FOREIGN PATENT DOCUMENTS 2094058 2/1972 France.
2211557 7/1974 France.
996208 6/1965 United Kingdom.

*Primary Examiner*—John Kight
*Assistant Examiner*—Nathan M. Nutter
*Attorney, Agent, or Firm*—Gene Harsh; Joseph C. Gil; Thomas W. Roy

[57] ABSTRACT

The present invention is directed to a process for the preparation of finely dispersed, easily spreadable, aqueous polyurethane reactive coating compositions suitable for coating textile sheet products, artificial leather or leather by the direct or transfer coating process by (i) forming an aqueous dispersion having a solids content of about 20–69 wt. % of blocked isocyanate prepolymers in the presence of from about 0.05–5% by weight of emulsifiers, (ii) adding during or after formation of the dispersion about 0.1 to 2.5% by weight of water soluble thickeners based on long chain polyethylene oxides, salts of poly(meth)acrylic acids or salts of carboxy methyl cellulose, up to 100% by weight of aqueous polymer solutions and/or polymer dispersions and optionally levelling agents, pigments, fillers or stabilizers and (iii) forming a coating composition having a viscosity of from about 3000 to 22,000 mPa.s/25° C. and with a solids content of about 20–69% by weight, by adding approximately equivalent quantities of (cyclo)aliphatic di- and/or polyamines.

The present invention is also directed to the coating compositions prepared by this process and their use for the reactive coating of substrates, particularly textile and leather or artificial leather substrates.

11 Claims, No Drawings

PROCESS FOR THE PREPARATION OF COATING COMPOSITIONS, AQUEOUS DISPERSIONS OF PU REACTIVE SYSTEMS AND THEIR USE FOR COATING

BACKGROUND OF THE INVENTION

Process for the preparation of coating compounds, aqueous dispersions of PU reactive systems and their use for coating.

1. Field of the Invention

This invention relates to a process for the preparation of finely dispersed, readily spreadable polyurethane reactive coating compounds having a viscosity of from about 3,000 to 22,000 mPa.s/25° C. and a total solids content of from about 20 to 69% by weight, characterized by the dispersion in water of from about 20 to 69% by weight of isocyanate prepolymers preferably blocked by ketoximes in the presence of from about 0.05 to 5% by weight of emulsifiers, thickening of the thin dispersion by about 0.1 to 2.5% by weight of water soluble thickener preferably based on relatively high molecular weight polyethylene oxides and salts of poly(meth)acrylic acid or salts of carboxy methyl celluloses, optionally with the addition of other aqueous polymer solutions, polymer latices and/or polymer dispersions, optionally with the addition of diluents and the usual additives such as pigments, fillers, and stabilizers and the addition of approximately equivalent quantities (based on the isocyanate prepolymers) of polyamines, preferably (cyclo) aliphatic diamines, addition of the thickener and of the polyamines being carried out before, during or after dispersion while the aqueous polymer solutions, polymer latices and/or polymer dispersions are added after dispersion of the isocyanate polymers and before or after addition of the thickeners.

The present invention also relates to coating compounds prepared in accordance with the process and their use for the reactive coating of textiles or leather substrates.

2. Description of the Prior Art

The manufacture of artificial leather and coated textile sheet products based on polyurethanes, which are versatile in their application, forms part of the state of the art. Coating materials for fashion garments, work garments and rainwear, shoe uppers, luggage and upholstery material, tenting material, maps, conveyor belts, etc. are manufactured by the application of one or more layers by the transfer or direct coating process.

The polyurethanes are worked up as solutions of the completely reacted polyurethanes in organic solvents or in the form of their aqueous dispersions. Coatings having a solid content per layer of 10 to 50 g/m², in particular 20 to 40 g/m² may be produced from the solutions or dispersions, which are usually at concentrations of 20 to 50%, by the knife coating or the reverse roll coating process. Where solutions are used, recovery or ecologically harmless destruction of the solvents entails considerable expense.

Solvent-free systems such as aqueous polyurethane dispersions and particularly the low solvent or solvent-free high solid reactive systems which have recently been introduced into coating technology are therefore gaining increasingly in importance.

Whereas 30 to 50% polyurethane dispersions can be used to produce the conventionally thin layers containing 20 to 40 g/m² per coat, the high solid reactive polyurethane systems described in German Offenlegungsschriften No. 2,902,090 (U.S. Pat. No. 4,248,756) and No. 2,814,079 (U.S. Pat. No. 4,299,868) and in our own unpublished patent application No. P 3,120,596 (U.S. application, Ser. No. 378,152, filed May 14, 1982, now U.S. Pat. No. 4,446,293) which can be heat hardened with amine chain lengthening agents or cross-linking agents, are particularly suitable for the production of thick layers, for example for adhesive coats, with solid contents, for example, of 60 to 300 g/m² per coat, but they are very limited in their application for thinner coats, for example containing 30 to 50 g/m². The state of the art has been documented particularly in German Offenlegungsschrift No. 2,814,079. Their preparation starts with blocked isocyanate prepolymers or with blocked isocyanate prepolymer solutions containing very small quantities (e.g. up to 10%) of organic solvents. Limited quantities (3 to 50% by weight) of aqueous polymer dispersions or polymer solutions having a solids content of 20 to 70% by weight are then stirred in, and the diamines or polyamines are added. Relatively coarse, viscous dispersions or mixtures are obtained, which are preferably only used for relatively thick coatings of the order of 60 to 300 g/m² and they are therefore preferably used for relatively thick adhesive coats.

The blocked isocyanate prepolymers in most cases have high viscosities, e.g. ≧80,000 mPa.s/20° C. Addition of the dispersions or aqueous polymer solutions causes a relatively slight change in viscosity. The isocyanate prepolymers are miscible with aqueous dispersions or polymer solutions up to proportions of about 1:1.

When attempts are made to prepare lower viscosity mixtures, the mixtures of blocked isocyanate prepolymers with larger quantities of PU dispersion are unstable. Thin coatings on this basis, containing, for example, 40 g/m², do not level out smoothly and have surface defects or cavities, especially when the transfer process is employed. They are therefore hardly suitable for top coats which must meet exceptionally high standards of appearance and quality.

It was therefore an object of the present invention to provide a process by which spread coating pastes of suitable viscosity could be obtained in the form of finely divided dispersions from heat hardening reactive polyurethane preparations based on blocked isocyanate prepolymers and polyamines for coating textile sheet products or leather by the transfer or direct coating method to form layers with low solid contents of only 10 to 50 g/m² which would form flawless coatings of the same high quality as polyurethanes obtained from reactive polyurethane preparations, even when used as top coatings.

SUMMARY OF THE INVENTION

A process for the preparation of finely dispersed, easily spreadable, aqueous polyurethane reactive coating compositions suitable for coating textile sheet products, artificial leather or leather by the direct or transfer coating process, which comprises (i) forming an aqueous dispersion having a solids content of about 20–69 wt. % of
  (a) blocked isocyanate prepolymers in the presence of
  (b) from about 0.05–5% by weight, based on (a), of emulsifiers,
(ii) adding during or after formation of the dispersion (c) optionally levelling agents, pigments, fillers or stabilizers, (d) about 0.1 to 2.5% by weight, based on (a), of water soluble thickeners based on long chain polyethylene oxides, salts of poly(meth)acrylic acids or salts of carboxy methyl cellulose, (e) up to 100% by weight of polymer solid substance, based on (a), of aqueous polymer solutions and/or polymer dispersions, and (iii) forming said coating composition having a viscosity of from about 3000 to 22,000 mPa.s/25° C. and with a solids content of about 20–69% by weight, by adding (f) approximately equivalent quantities, based on the blocked isocyanate groups of (a), of (cyclo)aliphatic di- and/or polyamines.

The present invention is also directed to the coating compositions prepared by this process and their use for the reactive coating of substrates, particularly textile and leather or artificial leather substrates.

DETAILED DESCRIPTION OF THE INVENTION

In a preferred embodiment, the blocked isocyanate prepolymer is dispersed in a solution of water, emulsifier, water soluble thickeners and optionally levelling agents and other additives, such as light stabilizers or fillers and approximately equivalent quantities of the polyamines may also be added, optionally after the addition of further polymer solutions or polymer dispersions, and the preparation is adjusted to the required concentration and viscosity for spread coating, with the addition of further thickener or water as required.

Dispersion of the polyurethane reactive coating compositions and dispersion of the blocked isocyanate prepolymer in water with the addition of emulsifiers can only give rise to very low viscosity, finely divided dispersions with viscosities of about 100–1,000 mPas which are not on their own capable of being spread coated. It is only by using suitable thickeners before, during or after dispersion that these dispersions can be brought to a spread coatable state, the further addition of levelling agents and other additives helping to ensure that satisfactory coatings will result.

According to the invention, the very finely divided, easily spreadable reactive polyurethane coating compositions obtained in the form of a dispersion can be applied as coatings containing only about 10–50 g/m², preferably about 20–40 g/m², with excellent flow and film forming characteristics of the coating compositions and excellent mechanical properties of the heat cured coatings. These coating compositions are therefore also suitable for the formation of thin top coats.

The spread coating pastes according to the invention may be applied, for example, by the transfer process to form top coats with exceptionally dry handle and compact bonding and intermediate coats, and after conversion into mechanically churned foam pastes they may also be used for the production of foamed bonding and intermediate coats which have only slight penetration into textile fabrics.

The coating pastes according to the invention may be applied by the direct coating process to prime textile sheet products such as woven and knitted fabrics or non-woven webs of various fiber materials which are subsequently coated with additional layers. Here again the slight penetration into the substrate is found to be an advantage.

In view of the state of the art, it was surprising to find that very low viscosity aqueous dispersions of the polyurethane reactive systems obtained from isocyanate prepolymers and polyamines could be obtained in a stable form as aqueous dispersions and could be used in a very finely divided form with the addition of very small quantities of certain thickeners to produce excellent coating compounds, in particular for the application of thin coats.

The heat curing polyurethane reactive systems which according to the invention are dispersed to form thickened spread coating pastes are known per se. These systems consist of blocked isocyanate prepolymers and of diamines and/or polyamines which are used for synthesizing the polyurea urethane with liberation of the blocking agent.

They have been fully described in German Offenlegungsschrift No. 2,902,090 (U.S. Pat. No. 4,248,756, incorporated herein by reference) and German Offenlegungsschrift No. 2,814,079 (U.S. Pat. No. 4,299,868, incorporated herein by reference). Other suitable reactive coating compositions also form the subject matter of unpublished German Patent Application No. 31 20 596.8 (U.S. application, Ser. No. 378,152, filed May 14, 1982, now U.S. Pat. No. 4,446,293).

The urethane prepolymers with blocked isocyanate end groups (component a) of the coating compounds according to the invention are prepared from straight chain or branched chain compounds with molecular weights of from about 400 to 10,000, preferably about 1,000 to 4,000, containing 2 to 8, preferably 2 to 4, most preferably 2 or 3 isocyanate reactive groups such as hydroxyl, amino, hydrazide, thiol or carboxyl groups, preferably hydroxyl groups (in particular polyester polyols and most preferably polyether polyols) and an excess of aromatic and/or cycloaliphatic and/or aliphatic polyisocyanates and blocking agents.

An NCO/OH equivalent ratio of from about 1.3:1 to 2.8:1 is preferably observed, most preferably from about 1.8:1 to 2.1:1, so that the urethane polymers contain from about 1 to 10% by weight, preferably from about 2 to 4% by weight of isocyanate groups (in blocked form).

The polyesters and/or polyethers used for the preparation of the urethane prepolymers are prepared from the known components, such as, for example, dihydric or trihydric alcohols, dibasic and tribasic carboxylic acids, hydroxy carboxylic acids, lactones, ethylene oxide, propylene oxide, butylene oxide-1,2 or tetrahydrofuran or mixtures thereof. Polyethers, polyesters, polylactones and polycarbonates having melting points below about 60° C., preferably below about 40° C., are preferred.

Suitable relatively high molecular weight compounds with isocyanate reactive groups for preparing the coating compounds according to the invention have been described in detail in German Offenlegungsschriften No. 2,431,846 and No. 2,402,840 (U.S. Pat. No. 3,984,607), German Auslegeschrift No. 2,457,387 (U.S. Pat. No. 4,035,213) and German Offenlegungsschrift No. 2,832,253.

Low molecular weight compounds with molecular weights from 32 to 399 containing 2 or more isocyanate reactive groups, preferably hydroxyl groups, such as the compounds described in German Offenlegungsschrift No. 2,832,253, may also be used, e.g. 1,4-butanediol, neopentylglycol or hydroquinone-bis(hydroxyethyl)-ether.

Exceptionally light fast and age resistant systems are obtained by the use of bis-carbazic ester polyols corresponding to the general formula

wherein R denotes a straight chained and/or branch chained $C_1$-$C_5$ alkylene or hydroxyl-substituted alkylene group, preferably an ethylene and/or 1,2-propylene group.

These "bis-carbazic ester polyols" are reaction products of 1 mol of hydrazine with 2 mols of any cyclic alkylene carbonate having 5 membered or 6 membered rings. Examples of cyclic alkylene carbonates for use as reactive components include ethylene glycol carbonate and 1,2-propylene glycol carbonate (2oxo-1,3-dioxolane and 2-oxo-4-methyl-1,3-dioxolane), the reaction product of 1 mol of glycerol with one mol of diphenyl carbonate (2-oxo-4-hydroxymethyl-1,3-dioxolane and 1,3-dioxanone-2-(ring compounds) which may be obtained by the reaction, for example, of 1,3-propanediol or neopentylglycol with diphenyl carbonate. The compound reacted with the hydrazine is preferably ethylene glycol carbonate or 1,2-propylene glycol carbonate. These bis-carbazic ester polyols, preferably bis-carbazic ester diols, are obtained by adding the appropriate quantity of the cyclic alkylene carbonate to hydrazine hydrate which is optionally dissolved in a solvent capable of moderating the reaction, such as toluene or isopropanol, the reaction being completed at about 100° C. and water of hydration and any solvent present being finally removed by distillation. The compounds, which are obtained in the form of colorless oils (especially in the case of propylene carbonate derivatives) or as solid substances (particularly when ethylene carbonate is used) can be directly used in this state for the reactions according to the invention. Reaction products of hydrazine with propylene carbonate, in which the OH groups are at least predominantly secondary OH groups, are preferred. The incorporation according to the invention of bis-carbazic ester polyols produces a surprisingly powerful effect in improving the light fastness characteristics as well as light resistances (i.e. less discoloration and less degradation on exposure to light) as well as a very marked reduction in yellowing by heat in the process of heat curing the reactive coating compounds.

The low molecular weight polyols used may also be di-, tri- and/or polyols containing tertiary aliphatic amino groups, e.g. N-methyl-bis-(2-hydroxypropyl)-amine, N-methyl-bis-(2-hydroxyethyl)-amine, N,N'-bis-hydroxyethyl-piperazine or triethanolamine.

Suitable aliphatic and/or cycloaliphatic polyisocyanates include those described, for example, in U.S. Pat. Nos. 3,984,607 and 4,035,213. Hexamethylene-1,6-diisocyanate, 1-isocyanato-3,3,5-trimethyl-5-isocyanatomethyl-cyclohexane and 4,4'- and/or 2,4'-diisocyanatodicyclohexyl methane should be particularly mentioned, as well as the di- and tetra-$C_1$-$C_4$-alkyl derivatives of these diisocyanates, and in particular mixtures of the above-mentioned diisocyanates. Hexane diisocyanate, isophorone diisocyanate and 4,4'-diisocyanatodicyclohexyl methane are preferred. Higher functional isocyanates may also be used, e.g. 1,6,11-triisocyanatoundecane or biuret polyisocyanates based on hexane diisocyanate, but these are less preferred.

Although coatings obtained from aliphatic polyisocyanates undergo less discoloration on exposure to light than those obtained from aromatic polyisocyanates, the aromatic polyisocyanates are more highly reactive, even in the blocked state, and can therefore be converted into chain lengthened or cross-linked polyurethane ureas at lower temperatures. Suitable aromatic di- and polyisocyanates include those described in German Offenlegungsschriften No. 2,902,090 (U.S. Pat. No. 4,248,756), No. 2,814,079 (U.S. Pat. No. 4,299,868) and No. 2,823,253, optionally in a modified form, but for technical purposes it is preferred to use 2,4- and/or 2,6-tolylene diisocyanates, 4,4'-diphenyl methane diisocyanate optionally mixed with its 2,4'- and 2,2'-isomers, 3,3'-dimethyl-4,4'-diisocyanatodiphenyl, di- or tetraalkyl substituted diphenyl methane-4,4'-diisocyanates, dimers of tolylene diisocyanate and/or diphenyl methane diisocyanate and higher functional polyisocyanates derived from these technically preferred diisocyanates, such as, for example, trimethylol propane-modified tolylene diisocyanates.

The blocking agents used for the isocyanate prepolymers may be any of those compounds used in polyurethane chemistry for masking isocyanate groups which are split off when heated above approximately 120° C. to release the isocyanate groups; for example, ketoximes of hydroxylamine and ketones such as acetone, methylethyl ketone, diethyl ketone, methylpropyl ketone, methylisopropyl ketone, methylisobutyl ketone, cyclohexanone, acetophenone and benzophenone, preferably butanoneoxime.

Alkyl esters of acetoacetic acid and of malonic acid, e.g. ethyl acetoacetate and diethyl malonate, lactams such as caprolactam, and phenols such as nonylphenol are also suitable blocking agents.

According to the invention, it is preferred to use isocyanate prepolymers of polypropylene glycol ethers and/or propoxylated 4,4'-dihydroxy-diphenyldimethyl methane (bisphenol A) and tolylene diisocyanate and/or diphenyl methane diisocyanate which are blocked with methylethyl ketoxime (butanoneoxime).

Suitable emulsifiers (b) include known emulsifiers, optionally used as mixtures, e.g ethoxylation products of fatty alcohols, fatty acids, fatty amines and alkylated phenols such as the ethoxylation products of oleyl alcohol, lauryl alcohol, oleic acids, stearylamine, nonylphenol and 3-benzyl-4-hydroxy biphenyl. Other suitable emulsifiers include salts of dodecyl benzene sulphonic acid, salts of alkylated naphthalene sulphonic acids, and reaction products of hydroxy polyethylene oxides with diisocyanates, e.g. tolylene diisocyanate. The quantity of emulsifier added, based on the prepolymer which is to be dispersed, is from about 0.05 to 5%, preferably from about 0.1 to 2%.

(c) Other additives which may be added to the aqueous spread coating pastes include about 0.1 to 2% of levelling agent, preferably silicones containing oxyalkylene groups, and up to about 1% of defoaming agent if the spread coating paste is to be used for the formation of compact coats;

up to about 20% of color pigments, color pastes or fillers such as chalk, silica, talcum or alumina; UV absorbents or light protective agents (e.g. about 0.1 to 1.5% by weight) may also be incorporated when blocked aromatic isocyanate prepolymers are used. The quantities of auxiliary agents indicated are based on the weight of the isocyanate prepolymer (a).

(d) The substances used for thickening, i.e. for adjusting the so-called spread coating viscosity of the aqueous dispersion of blocked isocyanate prepolymer (a), either before or after addition of the aminic crosslinking agent (f), are water soluble polymers (which are capable of producing considerable thickening when added in very small quantities), preferably long chain polyethylene oxides, salts of poly(meth)acrylic acids or salts of carbomethoxy cellulose.

The quantities of these thickeners used, based on isocyanate prepolymer (a), is from about 0.1 to 2.5% (preferably about 0.3 to 1.5%).

Additive (e) in the form of aqueous polymer solutions and/or polymer dispersions may be added to dispersed isocyanate prepolymer (a) in quantities of up to 100% by weight, preferably from about 10 to 50% by weight of polymer solid content, based on the solid content of (a).

Suitable polymer dispersions include, for example, polyurethane dispersions, aqueous latices of homo and copolymers of vinyl monomers, and optionally dienes.

The polyurethane dispersions may contain anionic, cationic or nonionogenic dispersion centers and optionally also external emulsifiers. Suitable PUR dispersions have been described, for example, by D. Dieterich et al in J. Oil Col. Chem. Assoc. 1970, 53, 363–379, in Die Angewandte Makromolekulare Chemie, 1972, 26. 85–106, in Angewandte Chemie 1970, 82, 53–63, and in German Offenlegungschriften Nos. 2,550,860; 1,495,745 (U.S. Pat. No. 3,479,310), 1,495,770 (U.S. Pat. No. 3,535,274), 1,495,847 (Canadian Pat. No. 764,009), 1,770,068 (U.S. Pat. No. 3,756,992) and 2,314,512.

Preferred PUR dispersions are those obtained from polyhydroxy polyesters, hexane- and/or isophorone diisocyanate and ethylene diaminoethane sulphonate corresponding to the formula:

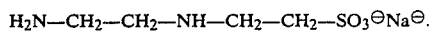

$H_2N-CH_2-CH_2-NH-CH_2-CH_2-SO_3^\ominus Na^\oplus$.

The polymer latices used according to the invention may be synthesized, for example, from the following monomers: acrylic and methacrylic acid alkyl esters, e.g. of methanol, ethanol or butanol; vinyl chloride, vinylidene chloride, vinyl acetate, vinyl alcohol (by saponification of polyvinyl acetate), ethylene, propylene, acrylonitrile, styrene, butadiene, isoprene, chloroprene, acrylamide, N-methylol acrylamide, methacrylamide, acrylic acid and methacrylic acid. Polymer latices of this type have been described, for example, in U.S. Pat. No. 3,869,413 and in German Offenlegungsschriften Nos. 2,550,832; 2,627,073 and 2,627,074.

Preferred polymer dispersions include those of butyl acrylate, styrene, acrylonitrile, acrylamide, acrylic acid and N-methylol acrylamide and optionally butadiene.

Apart from the polymer dispersions mentioned above by way of example, the prepolymers with blocked isocyanate end groups may also be mixed with polymers capable of dissolving or swelling in water, e.g. aqueous solutions of casein, caprolactam-modified casein, gelatine, cellulose ethers, polyacrylamide, polyvinyl alcohol, polyvinyl pyrrolidone or alginates.

The following are examples of isocyanate inert organic solvents which may be present in small quantities in the coating compounds according to the invention: isopropanol, ethylene glycol monomethyl ether, ethylene glycol monoethyl ether and their acetic acid esters; methylethyl ketone, cyclohexanone, butyl acetate and DMF.

For dispersing the blocked isocyanate prepolymers in water, the auxiliary agents such as emulsifiers or levelling agents may be incorporated in the high solid prepolymers and water may then be stirred into the mixture. Alternatively, the mixture of blocked isocyanate prepolymers and auxiliary agents may be stirred into a measured volume of water. It is advantageous to dissolve or disperse the auxiliary agents in water and then stir in the blocked prepolymers. Conversely, the aqueous solution or dispersion of auxiliary agents may be stirred into the prepolymers.

The cross-linking components (f) for the isocyanate prepolymers (a) according to the invention may be aliphatic or, preferably, cycloaliphatic amines having at least two primary amino groups, as described in detail in German Offenlegungsschrift No. 2,814,079. Aliphatic and cycloaliphatic diamines are preferred. These include, for example, 1,6-hexane-, 1,10-decane- and 1,12-dodecanediamines and 1,6,11-undecane triamine but cycloaliphatic diamines such as 2,4'- and/or 4,4'-diamino-dicyclohexyl methanes are preferred, and particularly also cycloaliphatic diamines corresponding to formula I

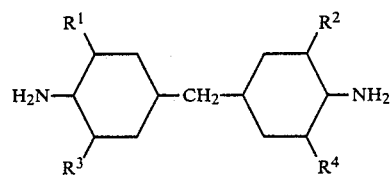

wherein $R^1$, $R^2$, $R^3$ and $R^4$ denote, independently of each other, hydrogen or a $C_1$-$C_3$ alkyl group (methyl, ethyl, propyl or isopropyl group) with the proviso that at least 75% of the diamine should be in the form of the cis,cis-isomer if $R^1$ to $R^4$ are all hydrogen.

Suitable polyamines include amines of formula III and IV which are liquid at room temperature and tricyclic amines according to German Offenlegungsschrift No. 2,638,731 (U.S. Pat. No. 4,146,559) (in particular the diamine of formula II):

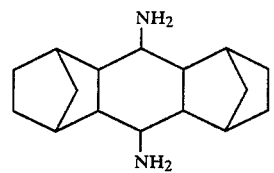

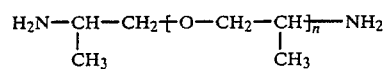

$n = 2-10$

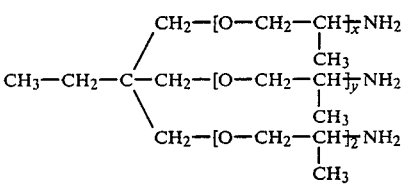

$3 \leq x + y + z \leq 9$

According to the invention, 4,4'-diamino-3,3'-dimethyl-dicyclohexyl methane is particularly preferred as cross-linking diamine according to the invention. This diamine is liquid at room temperature with a very low vapor pressure and suitable reactivity and gives rise to advantageous mechanical properties in the end product.

The equivalent ratio of blocked isocyanate groups to NH$_2$ groups in the coating compounds is generally in the range of from about 1.3:1 to 1:1.1, preferably from about 1.15:1.0 to 1:1 and particularly about 1.1:1.0. An isocyanate excess is generally advantageous whereas an unduly large NH$_2$ excess is generally less suitable.

The amine cross-linking agents (f) may be added to the dispersion at practically any stage, e.g. after dispersion of isocyanate prepolymer (a) or after addition of all the other auxiliary agents but they may also be incorporated with the isocyanate prepolymers before their dispersion. The solids concentration of blocked isocyanate prepolymer (a) plus amine cross-linking agent (f) in the dispersion is from about 20 to 69% by weight, in particular from about 40 to 50% by weight.

As already mentioned above, the coating compounds according to the invention are particularly suitable for coating textile sheet products, artificial leather, leather or split leather. The quantity applied may vary within wide limits but is generally from about 10 to 300 g/m$^2$, preferably from about 10 to 50 g/m$^2$, particularly from about 20 to 40 g/m$^2$. The coating compounds may be applied by the direct process or preferably by the reverse coating process. If desired, layers of conventional coating solutions or pastes may, of course, be applied to the substrate in addition to the coating compounds according to the invention. Such conventional formulations have been described in detail as top coats and bonding coats, for example in German Offenlegungsschrift No. 2,457,387 (U.S. Pat. No. 4,035,213).

The coating pastes according to the invention are preferably used as top coats in the reversal coating of textiles, leather or split leather. When used for this purpose, the top coat of coating compound according to the invention is applied to a suitable intermediate support (e.g. a steel strip, separating paper, silicone matrix or the like) in a thickness of about 10 to 50 g/m$^2$ and dried in a drying channel, and the bonding coat, preferably according to German Offenlegungsschrift No. 2,814,079 or a spread coating paste according to the invention, is applied to the dried top coat in a thickness of about 50 to 200 g/m$^2$ and backed with the substrate. The coating is then dried in a further drying channel at about 120°–190° C., preferably at about 140°–170° C., for about 1.5–3 minutes and the coated substrate is then stripped from the separating support.

As already mentioned above, however, the coating compounds according to the invention may also be applied to the textile substrate by the direct coating process, and they advantageously show only slight penetration.

Application of the pastes by the transfer or the direct coating process is carried out using the known techniques of the roller kiss coater, rubber cloth coater, reverse roll coater, etc. For highly concentrated spread coating pastes, it is also particularly advantageous to employ the modern techniques of screen printing and of engraved roller printing.

The quantities given in the following examples are to be understood as parts by weight or percentages by weight unless otherwise indicated.

EXAMPLES

Example 1

1.1 Preparation of the isocyanate prepolymer 2000 g of a polyether based on trimethylol propane and propylene oxide with a molecular weight of 6000, 1000 g of a linear polyether based on propylene glycol and propylene oxide with a molecular weight of 1000, 1450 g of a linear polyester based on hexane-1,6-diol, neopentyl glycol (molar diol-ratio 65:35) and adipic acid with a molecular weight of 1700 and 22.5 g of butane-1,4-diol were reacted with 1125 g of 4,4'-diisocyanatodiphenyl methane and 174 g of 2,4-diisocyanatotoluene for about 3 hours at 80°–90° C. until the isocyanate content was just below the calculated amount of 4.26% by weight. 496 g of butanone oxime and 696 g of ethylene glycol monomethyl ether acetate were then rapidly stirred in at 60°–70° C. No more isocyanate groups could be detected by IR spectroscopy after 20 minutes. The blocked isocyanate prepolymer, a colorless, clear liquid with a viscosity of about 40,000 mPa.s at 20° C., had a determinable latent isocyanate content of 3.3% by weight and thus an isocyanate equivalent weight of 1280.

1.2 Preparation of the top coating paste 10.0 g of the sodium salt of a carboxy methyl cellulose, 8.0 g of ethoxylated 3-benzyl-4-hydroxybiphenyl (degree of ethoxylation about 15), 2.0 g of a reaction product of hydroxy polyethylene oxide (degree of ethoxylation about 10) with tolylene diisocyanate in a molar ratio of 2:1 and 5.0 g of a water soluble dimethyl polysiloxane containing oxyethylene groups (about 10 ethoxyl groups) were dissolved in 418 g of water and 1.0 g of a high molecular weight dimethyl polysiloxane was added.

556 g of the blocked isocyanate prepolymer prepared according to Example 1.1 at a 90% concentration in ethylene glycol monomethyl ether acetate were dispersed in the aqueous phase with vigorous stirring. The resulting dispersion has a solids concentration of 50%, based on the blocked isocyanate prepolymer, and the viscosity is about 22,000 mPa.s/25° C. 50.0 g of 3,3'-dimethyl-4,4'-diamino-dicyclohexyl methane were stirred as the diamine into this dispersion. The viscosity of the coating paste was about 14,000 mPa.s/25° C. The paste was prepared for top coating by introducing 150 g of a commercial aqueous pigment paste of 40% TiO$_2$, 5% casein and water.

1.3 Isocyanate prepolymer 4000 g of a hydroxyl polyether based on trimethylol propane and propylene oxide with a molecular weight of 6000 and 275 g of a hydroxyl polyether based on 4,4'-dihydroxy-diphenyl-dimethyl methan (bisphenol A, Bayer AG) and propylene oxide with a molecular weight of 550 were reacted with 375 g of 4,4'-diisocyanatodiphenyl methane and 261 g of 2,4-diisocyanatotoluene at 80°–90° C. until the isocyanate content fell just below the calculated content of 2.56% by weight. 261 g of butanone oxime were then stirred into the mixture at 60°–70° C. No more isocyanate could be detected by IR spectroscopy after about 20 minutes. The blocked isocyanate prepolymer, a clear, colorless liquid with a viscosity of about 50,000 mPa.s at 20° C., had a determinable latent isocyanate content of 2.34% by weight and thus an isocyanate equivalent weight of 1800.

1.4 Preparation of bonding coat paste 510 g of a blocked isocyanate prepolymer containing 2% of methyl glycol and prepared according to Example 1.3 with a latent isocyanate content of about 2.3% were introduced into the reaction vessel. 20 g of ethoxylated 3-benzyl-4-hydroxy biphenyl (degree of ethoxylation 15) and 5.0 g of a reaction product of hydroxy polyethylene oxide with tolylene diisocyanate (as described under 1.2) were stirred into the isocyanate prepolymer.

A stable 50% dispersion of the blocked isocyanate prepolymer is obtained after the addition of 465 g of water with vigorous stirring. The bonding coat paste ready for use was obtained from the prepolymer by the addition of 31.6 g of 3,3'-dimethyl-4,4'-diaminodicyclohexyl methane as cross-linking agent. Viscosity—about 15,000 mPa.s/25° C.

1.5 Transfer coating (top coat + bonding coat)

1.5.1

The dispersion coating paste according to 1.2 was applied to a wet strength separating paper in a quantity when wet of about 70 g/m² by means of a roller coater on the first coating apparatus of a tandem coating machine. The water was evaporated in the drying channel at a temperature starting at 90° C. and rising to 160°-170° C., and the blocked isocyanate prepolymer was converted to the PUR polymer by reaction with the diamine crosslinking agent (reaction time 1.5 to 2 minutes). The top coat has a dry weight of about 35 g/m². The coating paste showed good levelling flow and gave rise to a top coat with a smooth surface and good, dry handle.

Bonding coat paste 1.4 was applied analogously in the second coating apparatus, wet application about 80 g/m², dry application about 40 g/m². The wet bonding coat was backed with a woven fabric of cotton or cotton/polyester weighing about 200 g/m². Drying and crosslinking were carried out in the same manner as for the top coat. A coated article with dry surface, soft handle, good grain, high folding strength, resistance to chemicals and high resistance to hydrolysis was obtained.

1.5.2

In an analogous process on a Tridem coating machine using the "dry laminating method" (as under 1.5.1), the top coat was formed in the first channel.

As under 1.5.1, the bonding coat paste 1.4 was applied with a wet application of about 80 g/m² in the second coating apparatus. After evaporation of the water in this case, however, a "preliminary reaction" of the blocked isocyanate prepolymer with the amine cross-linking agent was carried out at only 120°-135° C.

It was only in front of the third channel that the textile was backed onto the already "dry" bonding coat, and the cross-linking reaction was then completed in the third channel at 150°-160°-170° C.

Example 2

2.1 Preparation of bonding coat pastes

2.1.1 Dispersion of a blocked isocyanate prepolymer blended with a 1-component PUR dispersion 500 g of a 40% PUR dispersion were introduced into 1000 g of the dispersion of a blocked isocyanate prepolymer prepared according to Example 1.4 after the addition of 31.6 g of 3,3'-dimethyl-4,4'-diamino-dicyclohexyl methane as chain lengthening diamine. The resulting disperion mixture had a viscosity of about 7000 mPa.s/25° C. Preparation of the 40% PUR dispersion is described in Example 3 of U.S. Pat. No. 4,308,184.

2.1.2 Dispersion of a blocked isocyanate prepolymer in admixture with a polyacrylate dispersion 300 g of a 40% dispersion of a polyacrylate consisting of butyl acrylate, styrene and methylol acrylamide were added to 1031.6 g of the dispersion of a blocked isocyanate prepolymer containing diamine described under 1.4.

The dispersion mixture had a viscosity of about 10,000 mPa.s/25° C.

2.1.3 Dispersion of a blocked isocyanate prepolymer in admixture with a self cross-linking latex 200 g of a 40% nitrile-butadiene-rubber-latex of acrylonitrile, butadiene and N-methylol acrylamide were added to 1031.6 g of the dispersion of a blocked isocyanate prepolymer containing diamine described under 1.4. The dispersion mixture had a viscosity of about 12,000 mPa.s/25° C.

2.1.4 Dispersion of a blocked isocyanate prepolymer in admixture with a polyvinyl chloride dispersion 100 g of a 50% PVC dispersion were added to 1031.6 g of the dispersion of a blocked isocyanate prepolymer containing diamine described under 1.4. The dispersion mixture had a viscosity of about 15,000 mPa.s/25° C.

2.2 Transfer coating (top coat + bonding coat)

The dispersion top coat of Example 1.2 was applied in the first coating apparatus of a tandem coating installation as described in Examples 1 and 1.5.1. Wet application 60 g/m², dry weight of top coat 30 g/m². In the second coating apparatus, the bonding coat pastes, dispersion mixtures 2.1.1, 2.1.2 and 2.1.3 were applied alternatively, with a wet application of 60 g/m² and a dry application of about 30 g/m². A light-weight spun rayon fabric of 100 g/m² was backed onto the wet dispersion bonding coat. Drying and crosslinking were carried out at 90° C. to 170° C. A light weight, soft article with a soft handle, resembling nappa leather, was obtained.

Example 3

3.1 Isocyanate prepolymer 2000 g of a hydroxyl polyester based on hexane-1,6-diol, neopentyl glycol (molecular ratio of diols 65:35) and adipic acid with a molecular weight of 1700 were reacted with 358 g of 2,4-diisocyanato toluene at 80°-90° C. until the isocyanate content had fallen to 4.25% by weight. 174 g of butanone oxime and 250 g of ethylene glycol monomethyl ether acetate were rapidly stirred into this prepolymer at 70° C. No more isocyanate could be detected by IR spectroscopy after about 20 minutes. The blocked isocyanate prepolymer, a colorless, clear liquid having a viscosity of about 40,000 mPa.s at 20° C., had a determinable, latent isocyanate content of 3.5% by weight and thus an isocyanate equivalent weight of 1200.

3.2 Preparation of the top coating paste 350 g of the blocked isocyanate prepolymer according to 1.1 and 150 g of the blocked isocyanate prepolymer according to 3.1 were mixed.

To prepare a 45% dispersion of this blocked isocyanate prepolymer, 500 g of an aqueous preparation of the composition described below were stirred into the prepolymer mixture:

28.0 g of the sodium salt of a carboxymethyl cellulose
16.0 g of ethoxylated 3-benzyl-4-hydroxy-biphenyl (degree of ethoxylation about 15)
4.0 g of the reaction product of hydroxy polyethylene oxide (degree of ethoxylation about 10) with tolylene diisocyanate (molar ratio 2:1)
10.0 g of ethoxylated polymethyl siloxane (degree of ethoxylation about 10)
2.0 g of high molecular weight polydimethyl siloxane, and
940.0 g of water.

The resulting dispersion which 45% solids based on the blocked isocyanate prepolymer, had a viscosity of about 20,000 mPa.s. 46.0 g of 3,3'-dimethyl-4,4'-diamino-dicyclohexyl methane as cross-linking agent and 120 g of a commercial aqueous pigment paste (see Example 1) were stirred in.

3.3 Preparation of the intermediate coat paste 330 g of the aqueous preparation of dispersing agents, thickeners and defoamers described in this Example under 3.2 were introduced into the reaction vessel. 670 g of the blocked isocyanate prepolymer mentioned under 3.1 were dispersed in the aqueous preparation. A dispersion in which the solids concentration was 60% as regards the blocked isocyanate prepolymer was obtained. Before use, 65.5 g of 3,3'-dimethyl-4,4'-diamino-dicyclohexyl methane were stirred in as cross-linking diamine.

3.4 Preparation of the bonding coat paste (can be foamed mechanically)

500 g of a 40% PUR dispersion described in Example 2.1.1 and 10 g of ammonium stearate were added to 1000 g of the bonding coat paste described in Example 1.4 which already contained the quantity of diamine as cross-linking agent mentioned there. When this product was used as bonding coat, the dispersion preparation was mechanically churned to form a foam weighing 500 g/l.

3.5 Transfer coating on a Tridem coating machine

1st Channel: top coat (Example 3.2)
  Wet application: 60 g/m²
  Dry application: about 30 g/m²
2nd Channel: intermediate coat (Example 3.3)
  Wet application: 120 g/m²
  Dry application: about 75 g/m²
3rd Channel: bonding coat, churned foam (Example 3.4)
  Wet application: 70 g/m²
  Dry application: about 30 g/m²
  Unit Weight: 500-600 g/l
Drying and cross-linking conditions: 90° C.-170° C.

Dwell time at 140° C.-170° C.: about 1.5 minutes.

Example 4

4.1

A polyester fabric weighing 200 g/m² was primed by the direct coating process with the dispersion coating paste described in Example 1.4. Application about 40 g/m² dry weight.

The dispersion used as final coat was prepared as follows:

500 g of an isocyanate prepolymer (4.2) based on polyethers and diphenyl methane diisocyanate and blocked with butanone oxime were dispersed in 500 g of the aqueous preparation described in Example 3.2. 33.9 g of 3,3'-dimethyl-4,4'-diamino-dicyclohexyl methane were stirred in as cross-linking agent into the dispersion which was a 50% solids dispersion based on the blocked isocyanate prepolymer. The top coat was applied to the primed PES fabric by the direct coating process: wet application about 120 g/m², dry application about 60 g/m², drying and cross-linking conditions: 70° C.-170° C. rising.

4.2 Preparation of the isocyanate prepolymer (see above)

1600 g of a polyether of 80% propylene oxide and 20% ethylene oxide, OH number 28, started on trimethylol propane, and 200 g of a polyoxypropylene ether diol (OH number 200) started on 4,4'-dihydroxydiphenyl-dimethyl methane were dehydrated in a water jet vacuum for 30 minutes at 120° C. and then cooled to about 40° C. 200 g of 4,4'-diphenyl methane-diisocyanate and 140 g of tolylene diisocyanate (80:20 ratio of 2,4 and 2,6 isomers) were added. The mixture was then left to react at 60° C. until the isocyanate content was 2.9% (3-4 hours). When this isocyanate content had been reached, 129 g of butanone oxime were added dropwise and the mixture was maintained at 80° C. until all the isocyanate groups had reacted. The viscosity was adjusted to 60-65,000 mPa.s at 25° C. by the addition of 22 g of methylethyl ketone and 22 g of isopropanol. The masked isocyanate group content was 2.7%.

Example 5

5.1 Coating 500 g of the aqueous preparation of dispersing agents, thickeners and defoaming agents described in Example 3.2 were introduced into the reaction vessel. 500 g of an aliphatic, blocked isocyanate prepolymer 5.2 were added with vigorous stirring. A dispersion which was 40% solids, based on the prepolymer, and has a viscosity of about 12,000 mPa.s was obtained. 35.0 g of 3,3'-dimethyl-4,4'-diamino-dicyclohexyl methane were stirred in as cross-linking agent before use. This spread coating paste was applied to a woven polyamide fabric weighing about 100 g/m² by the direct coating process using a rubber cloth coater. The wet application was about 70 g/m², corresponding to a dry application of about 40 g/m². Drying and cross-linking conditions: 90° C.-170° C. Dwell time at 140° C. to 170° C.: about 3 minutes.

5.2 Preparation of the blocked isocyanate prepolymer 1000 parts of a hydroxyl polyester polycarbonate (OH number 56) prepared from the ester glycol of ε-caprolactone and hexane-1,6-diol (molar ratio 1:1) with diphenyl carbonate according to German Auslegeschrift No. 1,770,245 were reacted together with 298 parts by weight of 4,4′-diisocyanatodicyclohexyl methane (70% by weight of cis/cis isomer content) at 115° C. for about 2 hours, until the isocyanate content was found to be 4.1%. A solution of 23.6 parts by weight (0.1 mol) of the bis-carbazic ester diol described under 5.3 in 355 parts by weight of ethylene glycol monomethyl ether acetate was then added and the reaction was then continued until the isocyanate content of the isocyanate prepolymer solution was 2.7%. The solution was then cooled to about 70° C., 94 parts by weight of butanone oxime were added, and the isocyanate blocking reaction was checked by means of the IR spectrum after a further 10 to 20 minutes stirring. The oxime-blocked isocyanate prepolymer (80% solids) was a colorless, clear liquid with a viscosity of 35,000 mPa.s at 20° C. and had a determinable latent isocyanate content of 2.5% and thus an isocyanate equivalent weight of 1680.

5.3 Preparation of the bis-carbazic ester diol 50 parts by weight of hydrazine hydrate and about 100 parts by weight of toluene were introduced into a reaction vessel and the 2 phases which form were vigorously stirred. 204 parts by weight of propylene glycol carbonate (2-oxo-4-methyl-1,3-dioxolane) were added portion-wise at room temperature; a slight rise in temperature to about 60° C. was observed. Stirring was continued for 1 hour at 100° C. until all the propylene glycol carbonate had been added, and toluene and water of hydration were then distilled off at this temperature and 15–18 mbar. 236 parts by weight of a clear, colorless oil of bis-carbazic ester diol were left behind. After distillation (110° C./0.04 mbar), this residue was found to have a molecular weight of 236.

Formula:

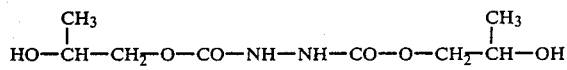

(and small proportions of the isomer with primary OH groups).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of finely dispersed, easily spreadable, aqueous polyurethane reactive coating compositions suitable for coating textile sheet products, artificial leather or leather by the direct or transfer coating process, which comprises
(i) forming an aqueous dispersion having a solids content of about 20–69 wt. % of
    (a) blocked isocyanate prepolymers in the presence of
    (b) from about 0.05–5% by weight, based on (a), of emulsifiers,
(ii) adding before, during or after formation of the dispersion
    (c) optionally levelling agents, pigments, fillers or stabilizers and
    (d) about 0.1 to 2.5% by weight, based on (a), of water soluble thickeners based on long chain polyethylene oxides, salts of poly(meth)acrylic acids or salts of carboxy methyl cellulose,
(iii) adding after formation of the dispersion
    (e) up to 100% by weight of polymer solid substance, based on (a) of aqueous polymer solutions and/or polymer dispersions, and
(iv) forming said coating composition having a viscosity of from about 3000 to 22,000 mPa.s/25° C. and with a solids content of about 20–69% by weight, by adding before, during or after formation of the dispersion,
    (f) approximately equivalent quantities, based on the blocked isocyanate groups of (a), of (cyclo)aliphatic di- and/or polyamines.

2. The process of claim 1 wherein said dispersion of step (i) has a solids content of 35–50% by weight, based on the weight of (a).

3. The process of claim 1 wherein up to 10% by weight of solvents, based on (a), are added to the coating composition.

4. The process of claim 1 wherein component (d) is present in an amount from about 0.3–1.5% by weight, based on (a).

5. The process of claim 1 wherein component (e) is present in an amount of from about 10–50% by weight of polymer solids, based on (a).

6. The process of claim 1 wherein said coating composition has a viscosity of from about 4000 to 15,000 mPa.s/25° C.

7. The process of claim 1 wherein component (f) is a cycloaliphatic diamine or a mixture of cycloaliphatic diamines.

8. The coating composition in accordance with claim 1.

9. A finely dispersed, easily spreadable aqueous polyurethane reactive coating composition suitable for coating textile sheet products, artificial leather or leather by the direct or transfer coating process, which is prepared by
(i) forming an aqueous dispersion having a solids content of about 35–50 wt. % of
    (a) blocked isocyanate prepolymers in the presence of
    (b) from about 0.1 to 2.5% by weight, based on (a), of emulsifiers,
(ii) adding before, during or after formation of the dispersion
    (c) optionally levelling agents, pigments, fillers or stabilizers and
    (d) about 0.3 to 1.5% by weight, based on (a), of water soluble thickeners based on long chain polyethylene oxides, salts of poly(meth)acrylic acids or salts of carboxy methyl cellulose,
(iii) adding after formation of the dispersion
    (e) optionally about 10–50% by weight of polymer solid substance, based on (a) of aqueous polymer solutions and/or polymer dispersions, and
(iv) forming said coating composition having a viscosity of from about 4000 to 15,000 mPa.s/25° C. and with a solids content of about 35–50% by weight, by adding before, during or after formation of the dispersion,
    (f) approximately equivalent quantities, based on the blocked isocyanate groups of (a), of cycloaliphatic diamines.

10. A coated textile sheet, artificial leather or leather substrate prepared by coating said substrate with the coating composition of claim 1 and subsequently heat hardening said coating at a temperature above about 110° C.

11. The coated substrate of claim 10 wherein said coating composition is applied in an amount of about 10–50 g/cm$^2$, based on the solids content of said coating composition.

* * * * *